US008842660B2

(12) United States Patent
Milstein et al.

(10) Patent No.: US 8,842,660 B2
(45) Date of Patent: Sep. 23, 2014

(54) VOIP VARIABLE METADATA

(75) Inventors: David Milstein, Redmond, WA (US);
David A Howell, Seattle, WA (US);
Linda Criddle, Kirkland, WA (US);
Michael D Malueg, Renton, WA (US);
Philip Andrew Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1316 days.

(21) Appl. No.: 11/394,578

(22) Filed: Mar. 31, 2006

(65) Prior Publication Data
US 2007/0230439 A1 Oct. 4, 2007

(51) Int. Cl.
H04L 12/66 (2006.01)
H04M 1/56 (2006.01)
H04M 15/06 (2006.01)
H04M 1/57 (2006.01)
H04M 3/42 (2006.01)

(52) U.S. Cl.
CPC .............. *H04M 1/571* (2013.01); *H04M 1/575* (2013.01); *H04M 3/42025* (2013.01)
USPC .................. 370/352; 379/142.01; 379/142.02; 379/142.1; 379/142.11

(58) Field of Classification Search
USPC ............... 379/142.1, 142.11, 142.06, 142.02, 379/142.01, 88.21, 266.01, 266.02; 370/352
See application file for complete search history.

(56) References Cited

U.S. PATENT DOCUMENTS

| 6,072,867 | A | 6/2000 | Lieuwen ................. 379/220.01 |
| 6,151,390 | A | 11/2000 | Volftsun et al. .............. 379/229 |
| 6,233,332 | B1* | 5/2001 | Anderson et al. ........ 379/265.09 |
| 6,310,944 | B1 | 10/2001 | Brisebois et al. ........ 379/142.01 |
| 6,343,117 | B1 | 1/2002 | Bhagavath et al. ........ 379/93.02 |
| 6,625,258 | B1 | 9/2003 | Ram et al. |
| 6,856,676 | B1 | 2/2005 | Pirot et al. .............. 379/201.01 |
| 7,088,810 | B1 | 8/2006 | Burg ....................... 379/201.02 |
| 7,162,237 | B1 | 1/2007 | Silver et al. ................ 455/432.3 |
| 7,284,046 | B1 | 10/2007 | Kreiner et al. ................ 709/223 |

(Continued)

FOREIGN PATENT DOCUMENTS

WO WO 2005/109734 11/2005 ............... H04L 9/00

OTHER PUBLICATIONS

Office Action mailed Aug. 19, 2009, in U.S. Appl. No. 11/437,596.
Office Action mailed Aug. 3, 2009, in U.S. Appl. No. 11/444,799.

(Continued)

*Primary Examiner* — Nicholas Jensen
(74) *Attorney, Agent, or Firm* — John Jardine; Andrew Sanders; Micky Minhas

(57) ABSTRACT

A method and system for communicating a variable set of contextual information relating to a conversation over a communication channel is provided. When the contextual information is exchanged, any authorized sending party of the contextual information can change the scope, content, or amount of the contextual information that is transmitted to a next receiving party in a determined communication channel path. Before transmitting the contextual information, a desirable scope of the contextual information may be determined based on the next receiving party, in conjunction with the sending party's rules. The contextual information may be updated by adding new contextual information and/or deleting part of the contextual information which is outside of the scope. No contextual information may be transmitted if the next destination desires no contextual information or does not have capabilities to receive any contextual information.

20 Claims, 17 Drawing Sheets

(56) References Cited

U.S. PATENT DOCUMENTS

| | | | |
|---|---|---|---|
| 7,330,542 B2 | 2/2008 | Kauhanen et al. | 379/229 |
| 7,359,496 B2 | 4/2008 | Qian et al. | 379/201.07 |
| 7,502,364 B2 | 3/2009 | Milstein et al. | 370/356 |
| 7,573,987 B1 | 8/2009 | Block et al. | 379/88.13 |
| 7,912,067 B2 | 3/2011 | Dalton et al. | 370/395.42 |
| 8,228,824 B2 | 7/2012 | Milstein et al. | |
| 2002/0016786 A1 | 2/2002 | Pitkow et al. | 707/3 |
| 2002/0027901 A1 | 3/2002 | Liu et al. | 370/352 |
| 2002/0035474 A1 | 3/2002 | Alpdemir | 704/270 |
| 2002/0085696 A1 | 7/2002 | Martin et al. | 379/201.03 |
| 2003/0018692 A1* | 1/2003 | Ebling et al. | 709/108 |
| 2003/0031165 A1 | 2/2003 | O'Brien, Jr. | 370/352 |
| 2003/0043974 A1* | 3/2003 | Emerson, III | 379/88.13 |
| 2003/0063590 A1 | 4/2003 | Mohan et al. | 370/338 |
| 2003/0108161 A1 | 6/2003 | Brown et al. | 379/88.01 |
| 2003/0130864 A1 | 7/2003 | Ho et al. | 705/1 |
| 2003/0138085 A1 | 7/2003 | Forman et al. | 379/142.01 |
| 2004/0028049 A1 | 2/2004 | Wan | 370/394 |
| 2004/0053573 A1 | 3/2004 | Karusawa | 455/41.2 |
| 2004/0076139 A1 | 4/2004 | Kang-Yeh et al. | 370/349 |
| 2004/0168090 A1 | 8/2004 | Chawla et al. | 713/201 |
| 2004/0203886 A1 | 10/2004 | Rohles et al. | 455/456.1 |
| 2004/0280304 A1 | 10/2004 | Miller | 379/210.02 |
| 2004/0240642 A1* | 12/2004 | Crandell et al. | 379/88.22 |
| 2005/0063522 A1 | 3/2005 | Kim et al. | 379/88.02 |
| 2005/0091328 A1 | 4/2005 | Saeidi | 709/206 |
| 2005/0117586 A1 | 6/2005 | Ikeda et al. | 370/395.21 |
| 2005/0243982 A1* | 11/2005 | Starbuck et al. | 379/88.23 |
| 2005/0272448 A1* | 12/2005 | Tran et al. | 455/456.6 |
| 2005/0288013 A1* | 12/2005 | Pines et al. | 455/432.3 |
| 2006/0029190 A1 | 2/2006 | Schultz | 379/88.01 |
| 2006/0067498 A1 | 3/2006 | Plas et al. | 379/201.01 |
| 2006/0153357 A1* | 7/2006 | Acharya et al. | 379/266.01 |
| 2006/0161632 A1 | 7/2006 | Wu et al. | |
| 2006/0184578 A1* | 8/2006 | La Rotonda et al. | 707/104.1 |
| 2006/0198310 A1 | 9/2006 | Stieglitz et al. | 370/241 |
| 2006/0218283 A1* | 9/2006 | Jones et al. | 709/227 |
| 2006/0239247 A1 | 10/2006 | Postmus | |
| 2006/0265508 A1 | 11/2006 | Angel et al. | |
| 2006/0287014 A1 | 12/2006 | Matsuura et al. | |
| 2007/0036316 A1* | 2/2007 | Croak et al. | 379/201.11 |
| 2007/0047726 A1 | 3/2007 | Jabbour et al. | 379/373.02 |
| 2007/0064895 A1* | 3/2007 | Wong et al. | 379/142.09 |
| 2007/0077914 A1 | 4/2007 | Plestid et al. | 455/411 |
| 2007/0133524 A1 | 6/2007 | Kwon | 370/356 |
| 2007/0224998 A1* | 9/2007 | Kimbrell | 455/445 |
| 2007/0237149 A1 | 10/2007 | Milstein et al. | 370/392 |
| 2007/0239428 A1 | 10/2007 | Milstein et al. | 704/5 |
| 2007/0253407 A1 | 11/2007 | Wang et al. | 370/352 |
| 2007/0263607 A1 | 11/2007 | Milstein et al. | 370/356 |
| 2007/0263819 A1* | 11/2007 | Finkelman et al. | 379/201.11 |
| 2007/0270126 A1 | 11/2007 | Forbes et al. | 455/411 |
| 2007/0274293 A1 | 11/2007 | Forbes et al. | 370/352 |
| 2007/0280225 A1 | 12/2007 | Forbes et al. | 370/389 |
| 2008/0266377 A1 | 10/2008 | Kim et al. | 348/14.02 |
| 2009/0154448 A1 | 6/2009 | Lee et al. | |
| 2010/0157851 A1* | 6/2010 | Farah | 370/260 |

OTHER PUBLICATIONS

Office Action mailed Dec. 4, 2008, in U.S. Appl. No. 11/444,799.
Office Action mailed Jan. 2, 2009, in U.S. Appl. No. 11/437,596.
Office Action mailed Nov. 18, 2009, in U.S. Appl. No. 11/444,799.
Office Action mailed Jan. 12, 2010, in U.S. Appl. No. 11/437,596.
Office Action mailed Apr. 13, 2010, in U.S. Appl. No. 11/398,817.
Office Action mailed Jun. 14, 2010 in U.S. Appl. No. 11/444,799.
Office Action mailed Jul. 6, 2010, in U.S. Appl. No. 11/437,596.
Office Action mailed Apr. 29, 2010 in U.S. Appl. No. 11/415,323.
Office Action mailed Oct. 6, 2010, in U.S. Appl. No. 11/398,817.
Office Action mailed Oct. 7, 2010, in U.S. Appl. No. 11/415,323.
Office Action mailed Apr. 22, 2011, in U.S. Appl. No. 11/415,323.
Office Action mailed May 24, 2011, in U.S. Application No. 11/398,817.
Office Action mailed Jun. 26, 2012, in U.S. Appl. No. 11/415,323.
Office Action mailed Nov. 8, 2011, in U.S. Appl. No. 11/415,323.
Office Action mailed Nov. 28, 2011, in U.S. Appl. No. 11/398,817.
Office Action mailed Jul. 20, 2011, in U.S. Appl. No. 11/437,596.
Office Action mailed Jul. 27, 2011, in U.S. Appl. No. 11/444,799.
Office Action mailed Dec. 15, 2010, in U.S. Appl. No. 11/444,799.
Office Action mailed Oct. 25, 2012, in U.S. Appl. No. 11/415,323.
Office Action mailed Dec. 20, 2012, in U.S. Appl. No. 11/441,519.
Office Action mailed Dec. 21, 2010, in U.S. Appl. No. 11/437,596.
Office Action mailed Feb. 1, 2011, in U.S. Appl. No. 11/441,519.
Office Action mailed Aug. 1, 2012, in U.S. Appl. No. 11/441,519.
Office Action mailed Nov. 22, 2013, in U.S. Appl. No. 11/441,519.
Office Action mailed Jul. 3, 2014, in U.S. Appl. No. 11/441,519, 22 pgs.

* cited by examiner

VOIP VARIABLE METADATA

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services. However, as enhanced calling features and advanced services grow in popularity and complexity, the amount of contextual information to be transmitted in order to provide such features and services becomes excessively large. With regard specifically to enhanced calling features and advanced services, current VoIP approaches may not allow service providers to control the amount of contextual information to be transmitted.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for communicating a variable set of contextual information relating to a conversation over a communication channel is provided. When the contextual information is exchanged, any authorized sending party of the contextual information can change the scope, content, or amount of the contextual information that is transmitted to a next receiving party in a determined communication channel path. Before transmitting the contextual information, a desirable scope of the contextual information may be determined based on the next receiving party, in conjunction with the sending party's rules. The contextual information may be updated by adding new contextual information and/or deleting part of the contextual information which is outside of the scope. No contextual information may be transmitted if the next destination desires no contextual information or does not have capabilities to receive any contextual information.

In accordance with an aspect of the invention, a method for communicating contextual information relating to a conversation on a communication channel is provided. A computing device obtains contextual information and processes the obtained contextual information. The computing device identifies a set of desired information from the contextual information and stores the identified set of information. Further, the computing device determines whether to change the scope of the contextual information to be transmitted. In response to determining a change in the scope, the computing device updates the scope and transmits the contextual information within the updated scope.

In an aspect of the method, in accordance with the updated scope, the computing device may include additional information with the contextual information. Further, the computing device may identify information to be deleted from the contextual information and then delete the identified information from the contextual information. The computing device may remove all contextual information to be transmitted.

In accordance with another aspect of the invention, a method for collecting and transmitting contextual information relating to a conversation on a communication channel between a first client and a second client is provided. A computing device obtains contextual information from the first client. The computing device identifies a set of desired information from the contextual information obtained from the first client; and stores the set of identified information. Further, a set of conditions relating to the first client may be identified from the obtained contextual information. Based on the set of conditions, the computing device determines a scope of the contextual information to transmit to the first client. The computing device receives contextual information from the second client and filters the second client's contextual information based on the determined scope of the contextual information. The filtered contextual information is transmitted to the first client.

In accordance with yet another aspect of the invention, a computer-readable medium having computer-executable components for collecting and transmitting contextual information is provided. The computer-executable components include a scope management component for determining a scope of the contextual information to be transmitted. Further, the computer-executable components include a contextual information handling component for obtaining the contextual information, determining the contextual information to be transmitted based on the scope and transmitting the determined contextual information as part of a conversation. The contextual information handling component removes all contextual information in response to a determination that no contextual information is to be transmitted as part of the conversation. Upon determination of a scope change, the contextual information handling component identifies a set of contextual information which is to be removed before being transmitted. The contextual information handling component processes the obtained contextual information and stores the processed contextual information in a local storage.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for transmitting a variable set of contextual information relating to a conversation over a communication channel. More specifically, the present invention relates- to a method and system for determining various scopes of contextual information, and the contextual information represented according to "structured hierarchies" is transmitted within the determined scope. "Structured hierarchies," as used herein, are predefined organizational structures for arranging contextual information to be exchanged between two or more VoIP devices. For example, structured hierarchies may be XML namespaces. Further, a VoIP conversation is a data stream of information related to a conversation, such as contextual information and voice information, exchanged over a conversation channel. When the contextual information is exchanged, any authorized sending party of the contextual information can change the scope, content, or amount of the contextual information that is transmitted to a next receiving party in a determined communication channel path. Although the present invention will be described with relation to illustrative structured hierarchies and an IP telephony environment, one skilled in the relevant art will appreciate that the disclosed embodiments are illustrative in nature and should not be construed as limiting.

Figure 1:
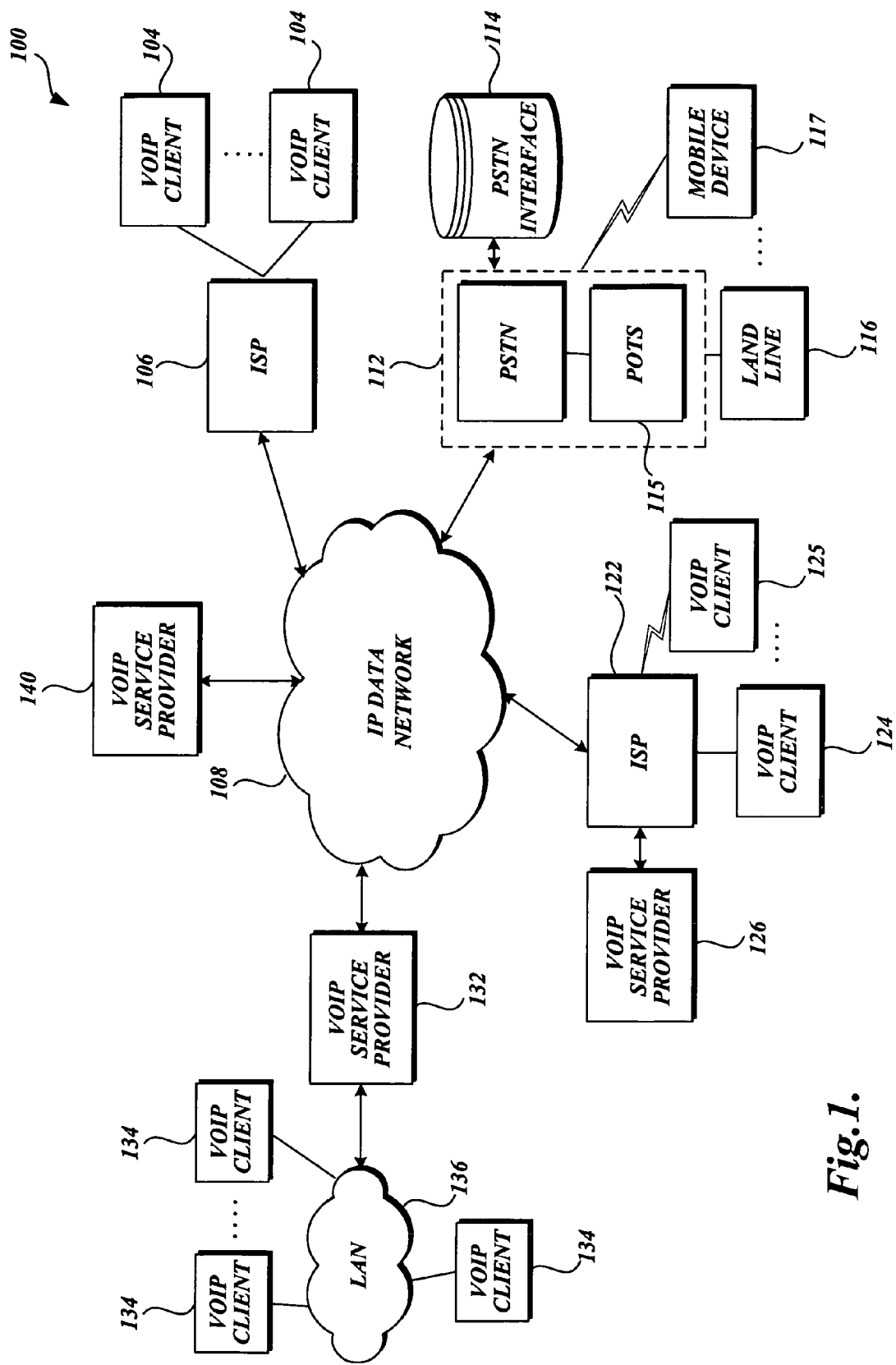
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. The VoIP service providers 126, 132, 140 may also generate, maintain, and provide voice profiles for individuals communicating in a call conversation. As an alternative, or in addition thereto, VoIP clients 104, 124, 125, 136 may create, maintain, and provide voice profiles.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the environment 100 is merely exemplary. It will be appreciated by one of ordinary skill in the art that various VoIP entities on Internet, intranet, and/or any combination of networks suitable for exchanging media and contextual information can be part of the environment 100. For example, VoIP clients 134 coupled to LAN 136 may be able to communicate with other VoIP clients 104, 124, 125, with or without VoIP service provider 132. Further, an ISP 106, 122 can also provide VoIP services to its client.

Figure 2:
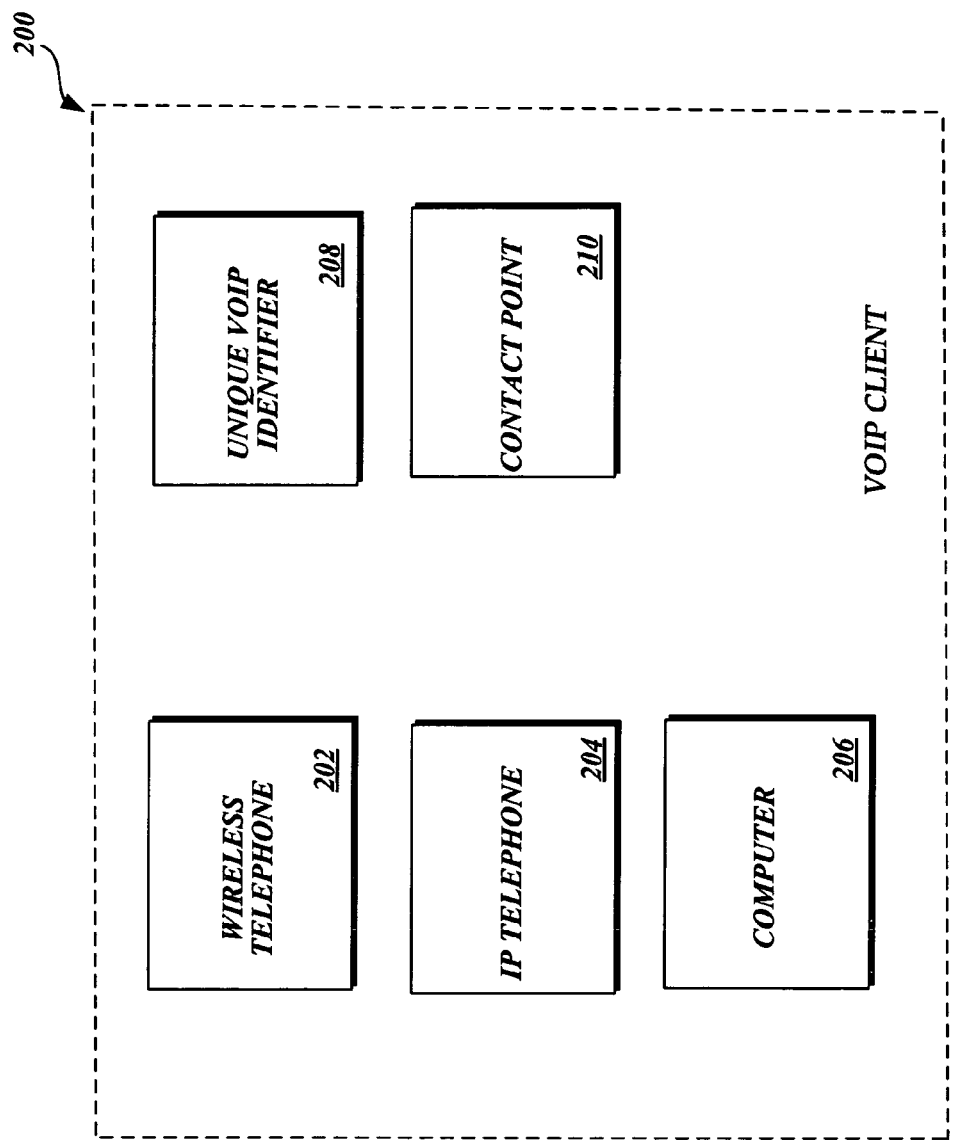
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
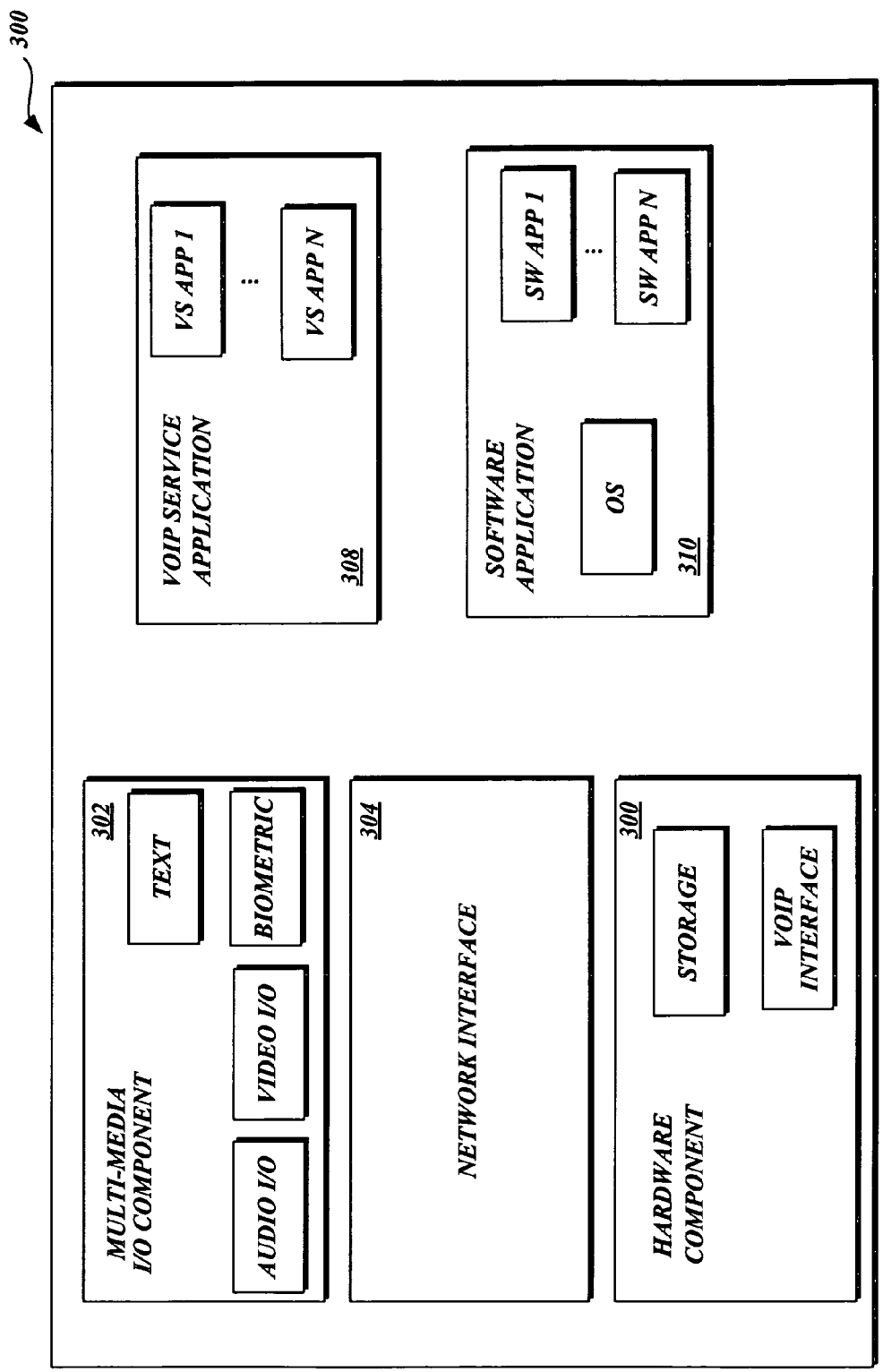
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
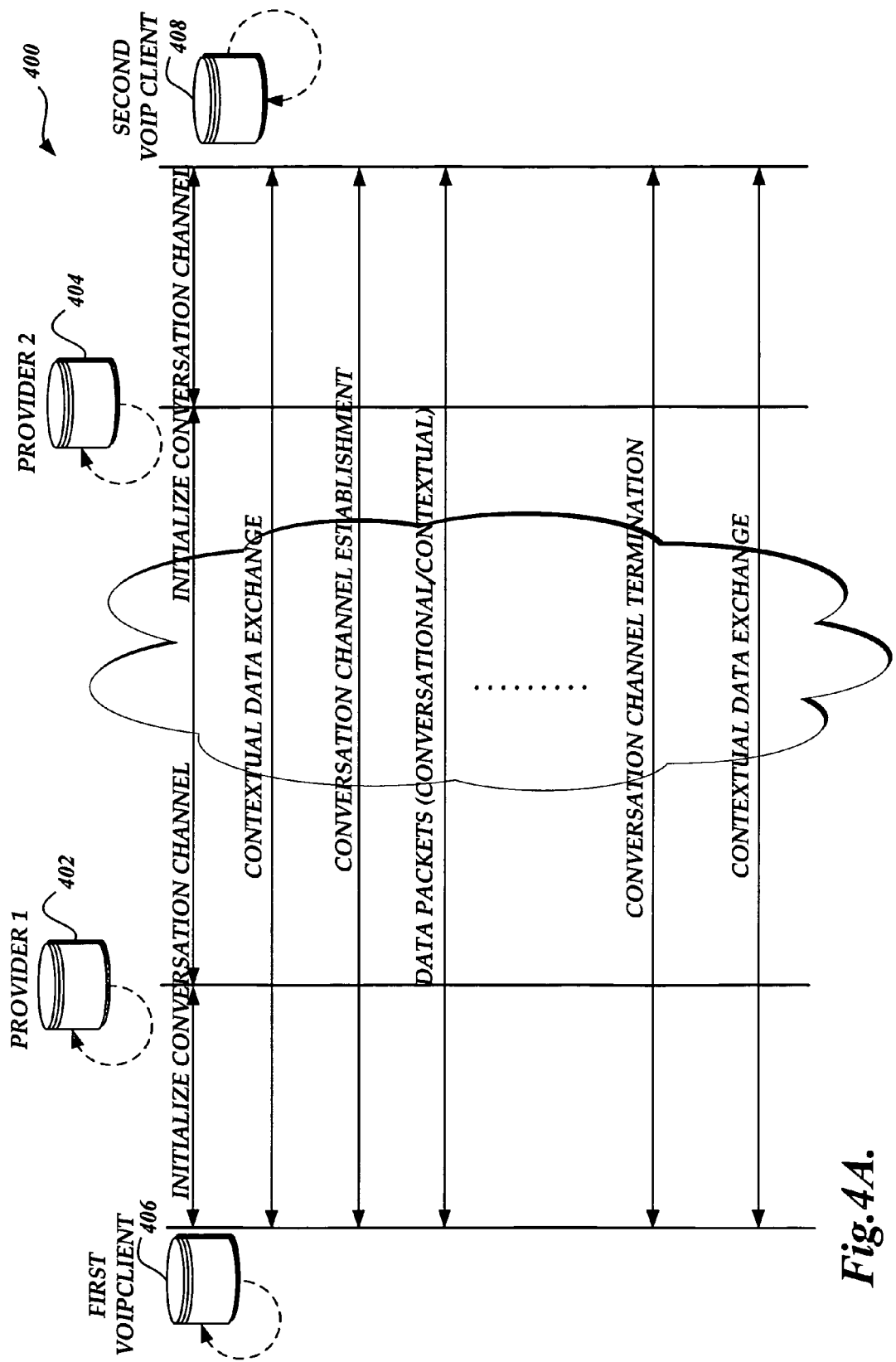
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
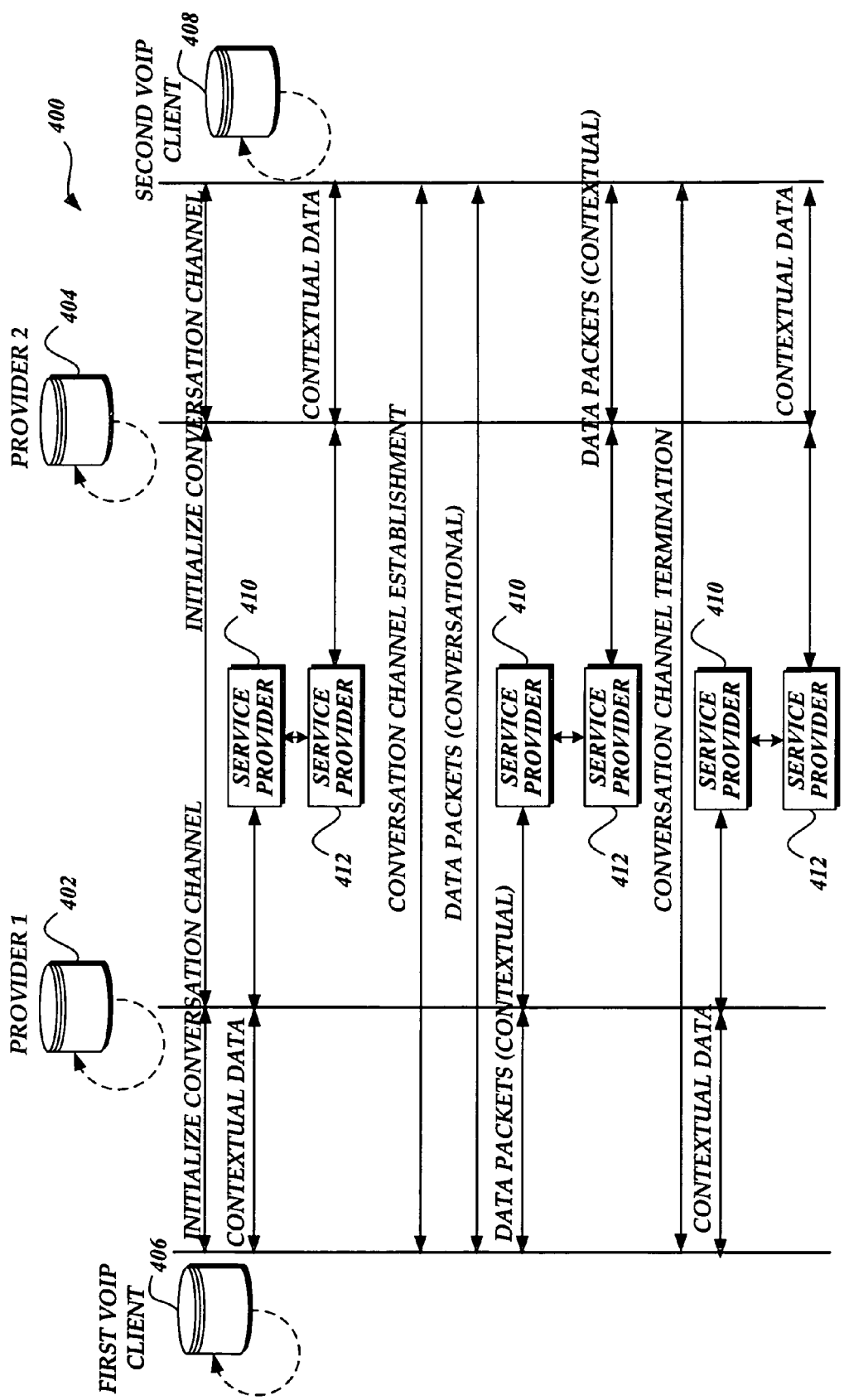

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
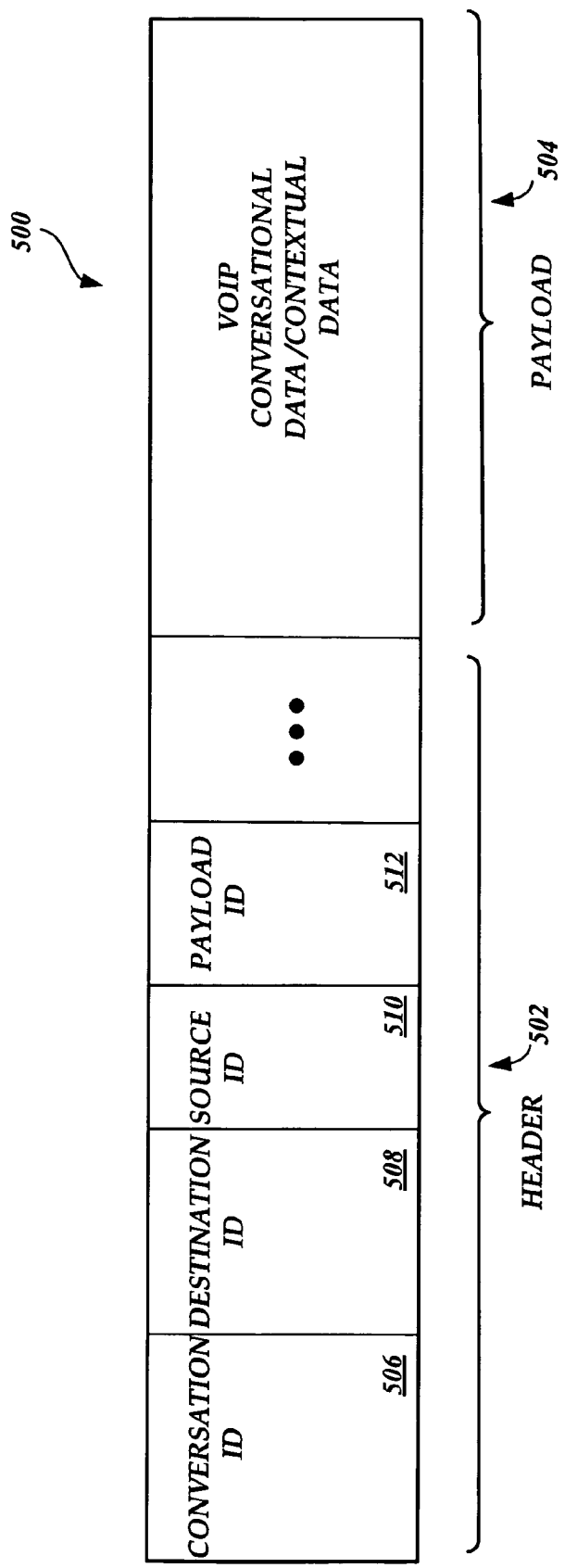
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, the contextual information may include client preference, client rules, client's location (e.g., user location, device location, etc.), biometrics information, the user's confidential information, VoIP device functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
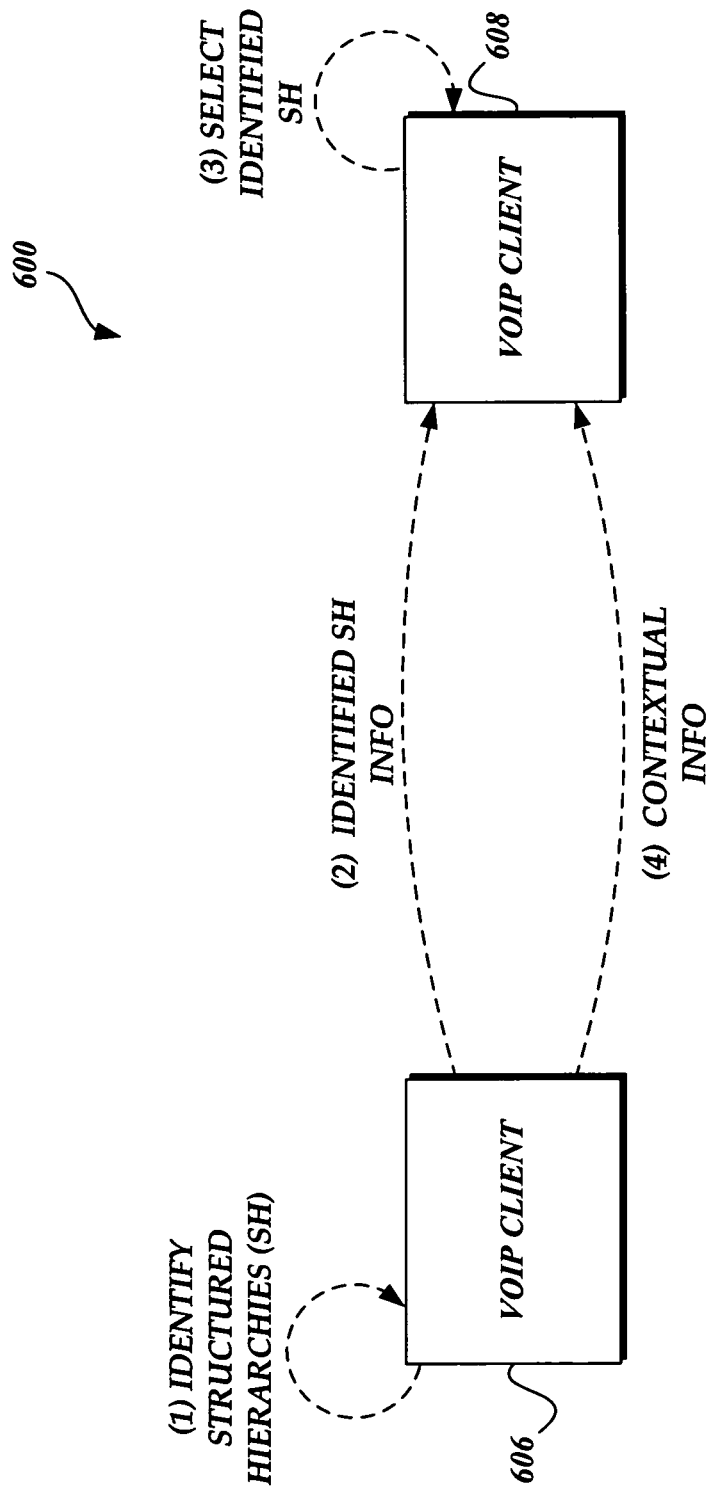
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies is used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
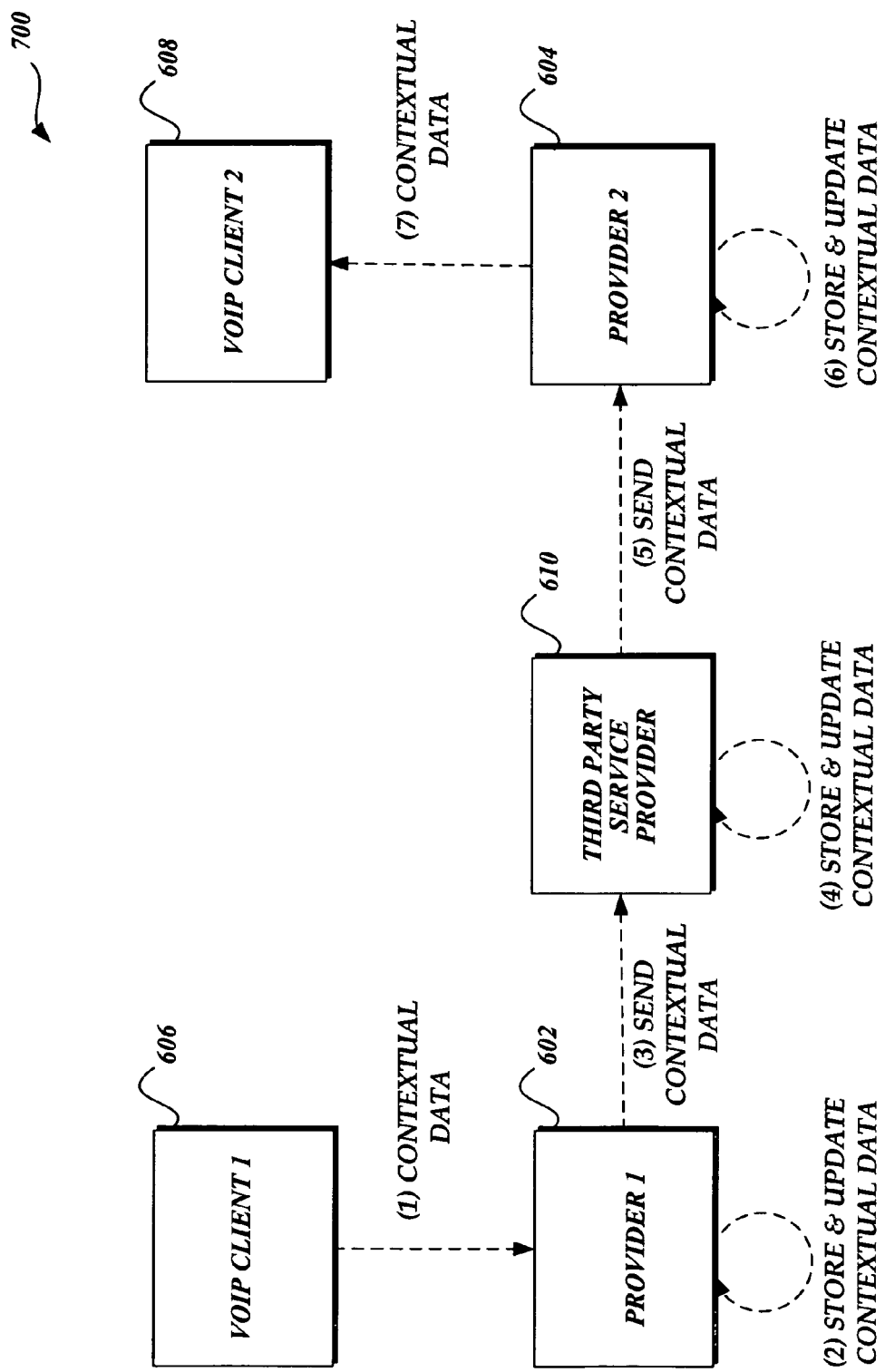
FIG. 7 is a block diagram illustrating interactions between two clients for collecting and transferring contextual information in accordance with an aspect of the present invention.
Figure 8:
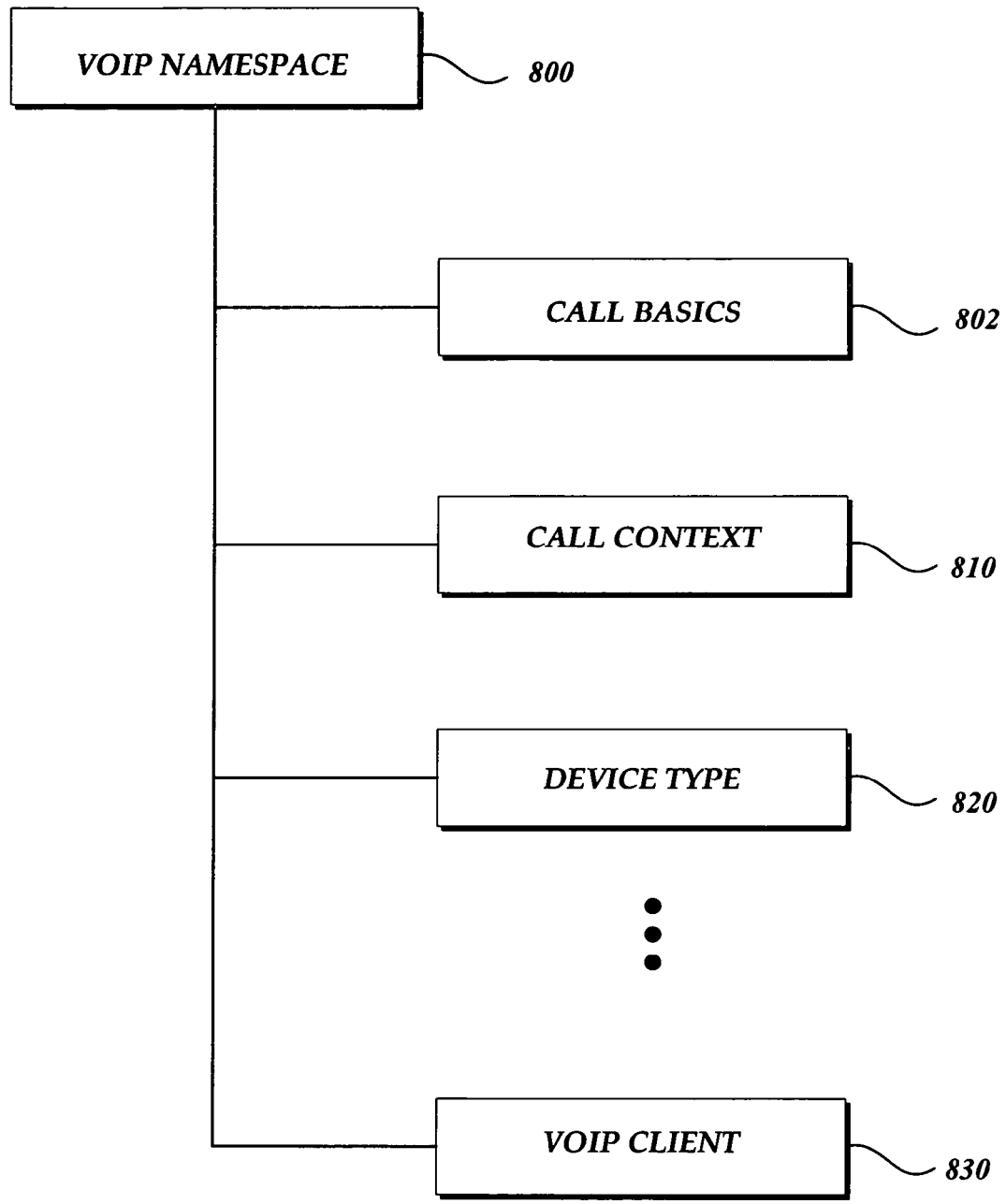
FIGS. 8-12 are block diagrams illustrative of various attributes and classes of structured hierarchies corresponding to VoIP contextual information in accordance with an aspect of the present invention.

With reference to FIG. 7, a block diagram 700 illustrating interactions among several VoIP entities for collecting and transferring contextual information via various service providers, in accordance with an embodiment of the present invention, is provided. The VoIP entities may include VoIP clients 606, 608, VoIP service providers 602, 604, third party service providers 610 and the like. Among VoIP entities, contextual information may be exchanged using predefined structured hierarchies such as XL namespaces. For discussion purposes, assume that VoIP Client 606 has Provider 1 602 for the VoIP service provider and a third party provider 610 is available for providing additional VoIP services. VoIP Client 606 and VoIP Client 608 have established a conversation channel between devices of VoIP Client 606 and VoIP Client 608 via Provider 1 602 and Provider 2 604. A third party service provider 610 can receive contextual information of VoIP Clients 606, 608 from VoIP service providers 602, 604. While this example utilizes two VoIP service providers and two VoIP clients, any number and combination of VoIP clients, service providers, and/or third party service providers may be used with embodiments of the present invention. For example, several clients can establish multi-communication channels and exchange contextual information with each other. In this example, each client and/or other VoIP entities can change the scope, content, or amount of contextual information that is transmitted to a next receiving party via a determined communication channel path.

In one embodiment, Provider 1 602 may identify particular contextual information which will be obtained from VoIP Client 606. VoIP Client 606 collects the identified contextual information and identifies structured hierarchies which will be used to carry the identified contextual information. The collected contextual information is transmitted from VoIP Client 606 to Provider 1 602 utilizing the identified structured hierarchies. Provider 1 602 may process the received contextual information based on the identified structured hierarchies and store desired parts of the processed contextual information. In an illustrative embodiment, while processing the received contextual information, Provider 1 602 may identify and obtain additional contextual information relating to the conversation and update the received contextual information accordingly. Further, while processing the received contextual information, Provider 1 602 may identify part of the received contextual information to be removed before transmitting the contextual information and then update the received contextual information accordingly. Provider 1 602 may store a subset of the received contextual information corresponding to the removed and/or updated contextual information for future reference by VoIP entities or for use in by applications on Provider 1 602.

In one embodiment, the information regarding the identified structured hierarchies is also transmitted to Provider 1 602, or directly to VoIP Client 606. The information regarding the identified structured hierarchies may include the information about which structured hierarchies are used to carry the contextual information, how to identify the structured hierarchies, and the like. Provider 1 602 transmits the information regarding the identified structured hierarchies and the contextual information to the third party SP 610. The third party SP 610 may collect more contextual information, if necessary, and update the received contextual information by adding, deleting and/or modifying information. The third party SP 610 may store a subset of the received contextual information corresponding to the removed and/or updated contextual information for future reference by VoIP entities or for use in by applications on the third party SP 610.

Upon updating the contextual information, the third party SP 610 sends the contextual information including the updated contextual information to Provider 2 604. Upon receipt of the information regarding the identified structured hierarchies and the contextual information, Provider 2 604 processes the received contextual information and stores part of the processed contextual information.

In an illustrative embodiment, while processing the received contextual information, Provider 2 604 may identify additional contextual information to be transmitted to VoIP Client 608 and update the received contextual information accordingly. Further, while processing the received contextual information, Provider 2 604 may identify a part of the received contextual information to be removed before transmitting the contextual information to VoIP Client 608 and, then, update the received contextual information accordingly. In this example, Provider 2 604 may transmit minimal or no contextual information to VoIP Client 608. For example, VoIP Client 608 may not need to receive any contextual information or VoIP Client 608 may not have devices with capabilities to process some of the contextual information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, XML namespace is provided to give the namespace a unique name. In some instances, the namespace may be used as a pointer to a centralized location containing default information about the namespace.

In accordance with an illustrative embodiment, VoIP Client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
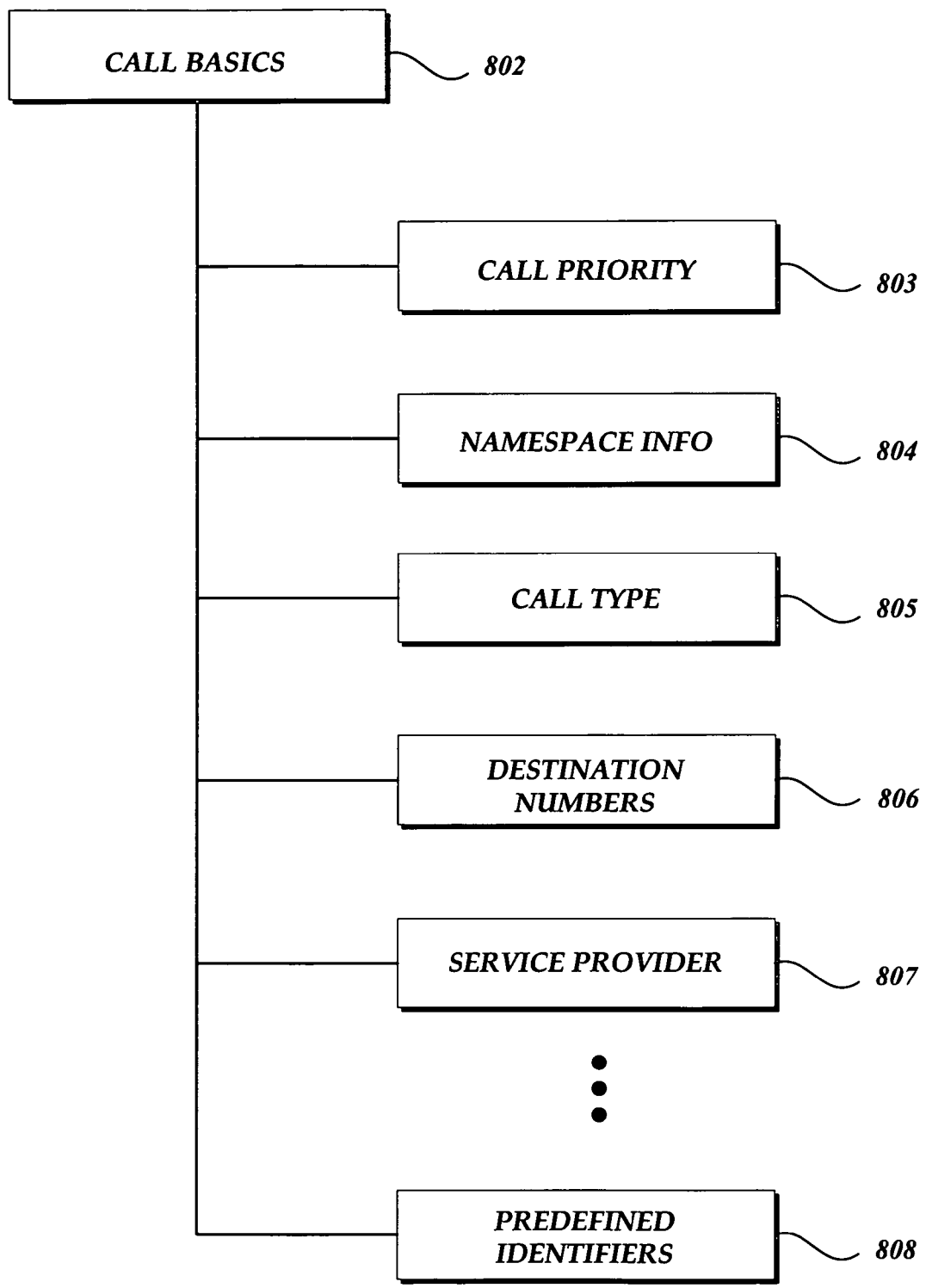

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
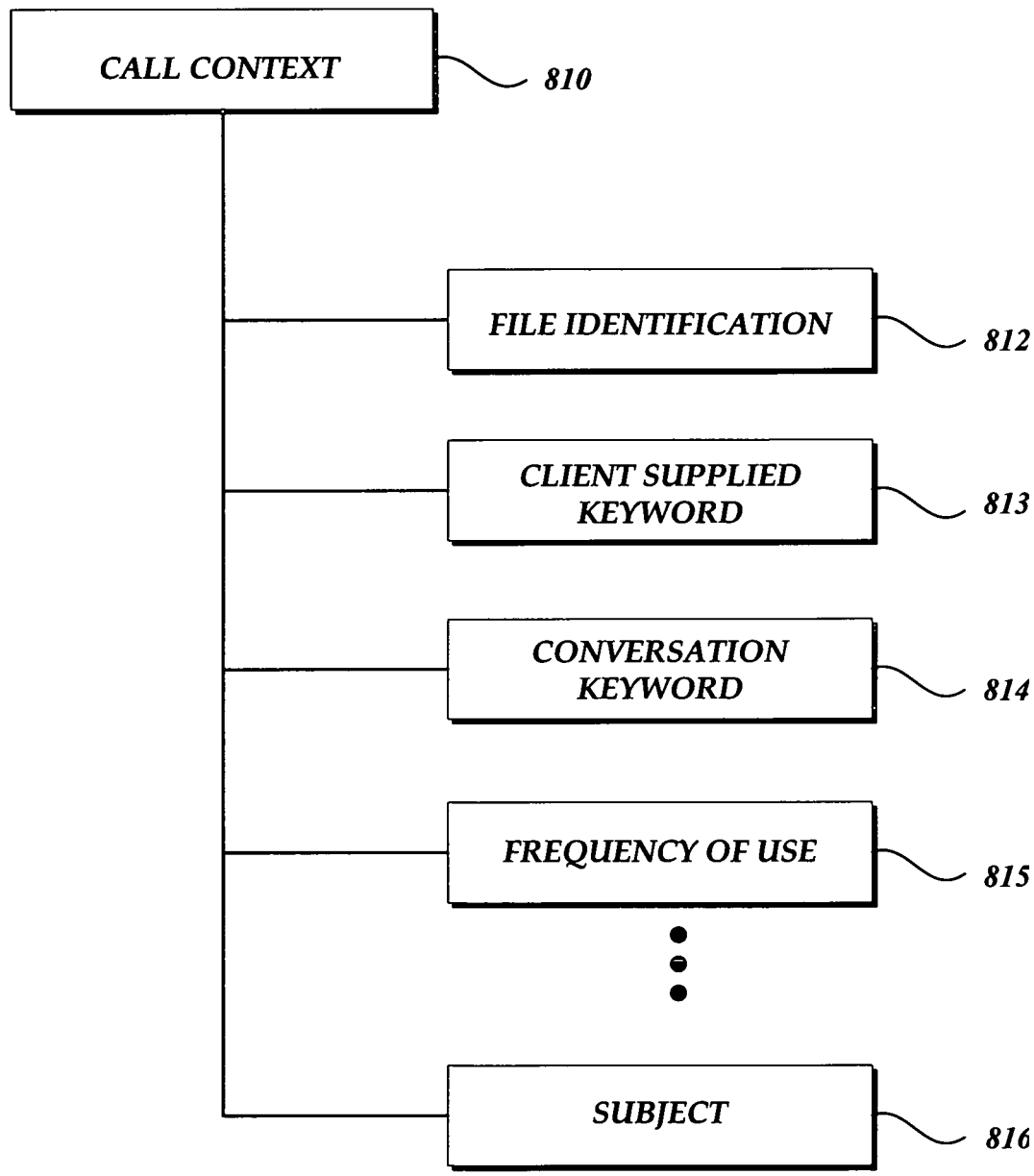

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
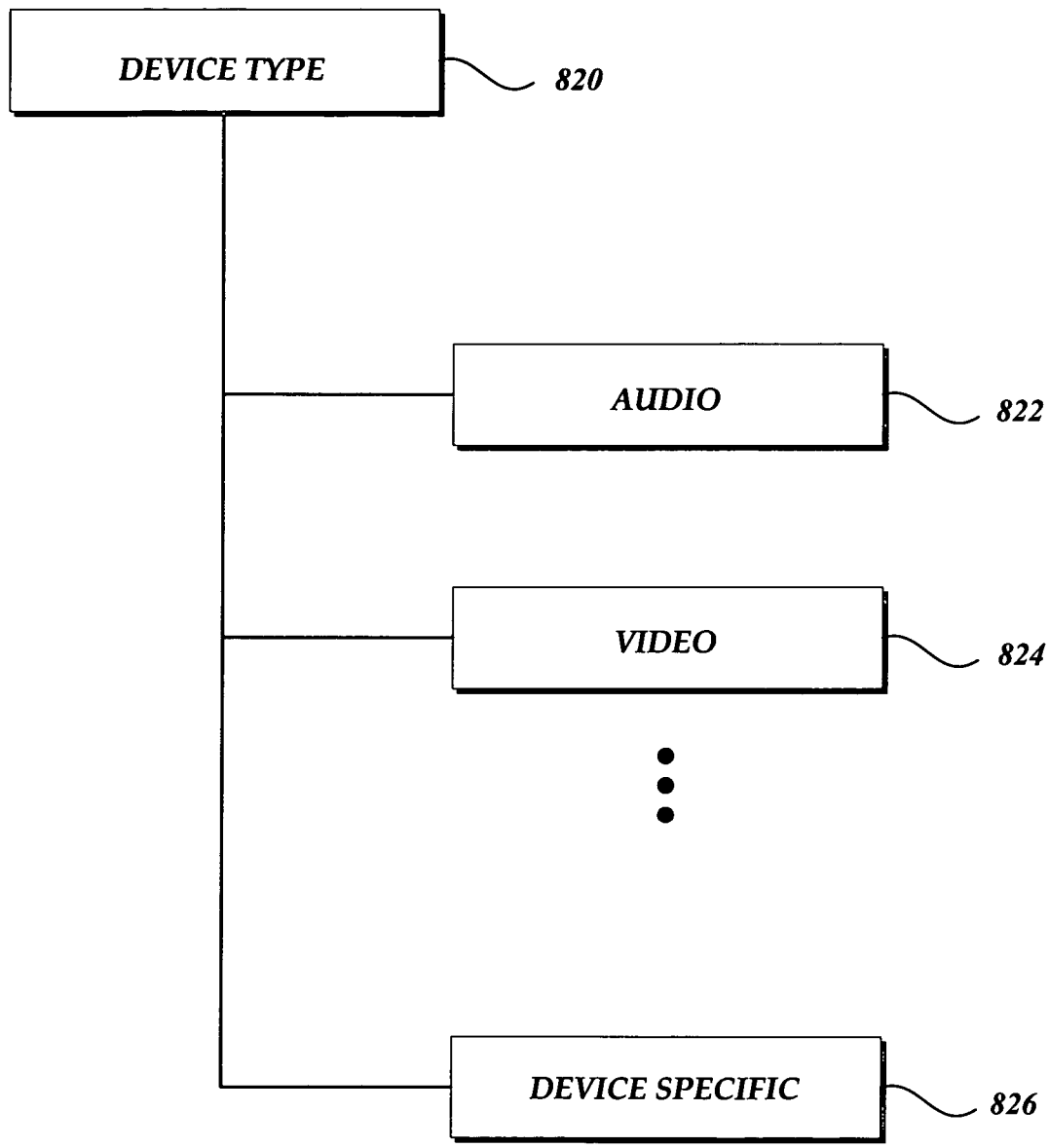

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
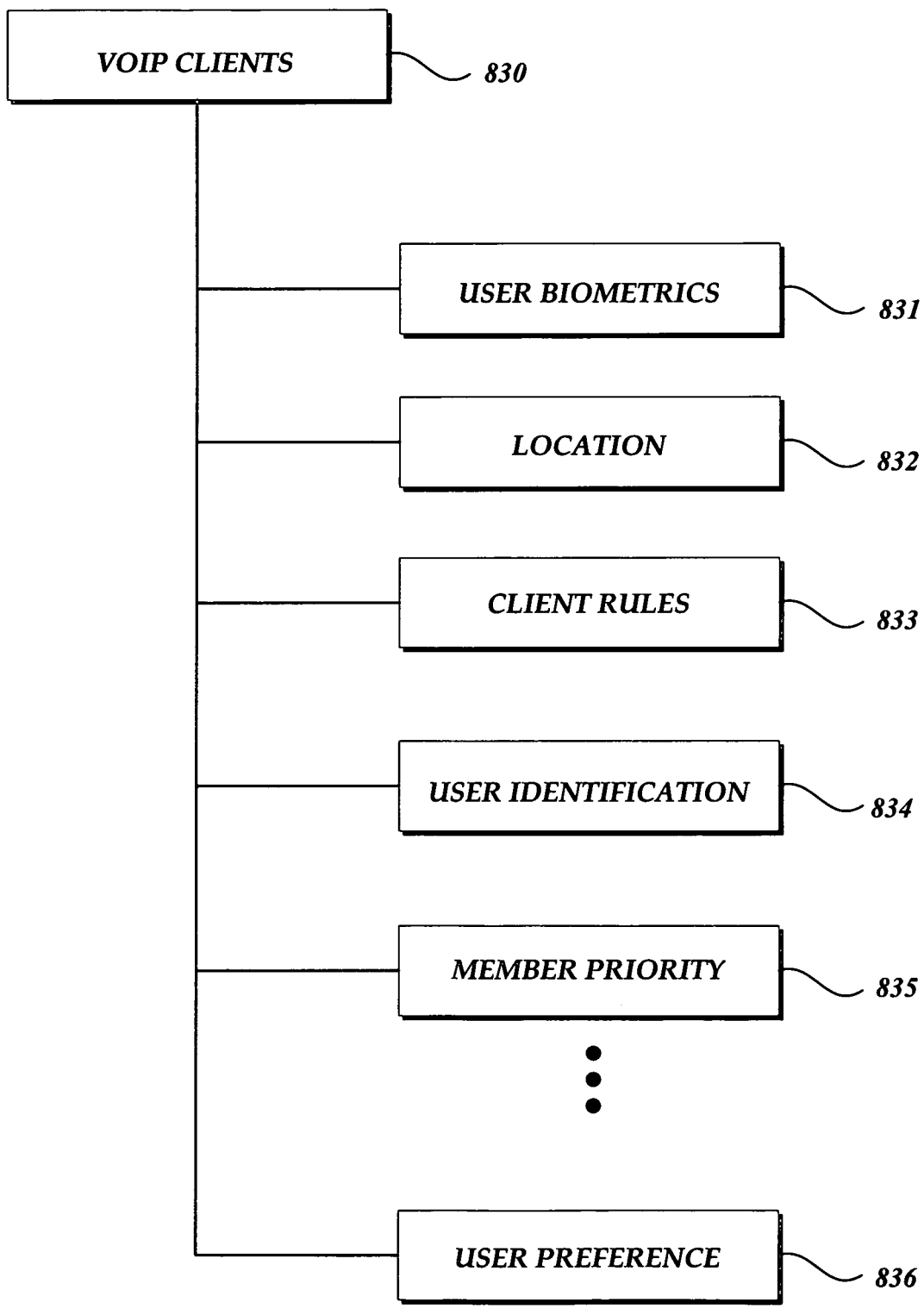

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Figure 13A:
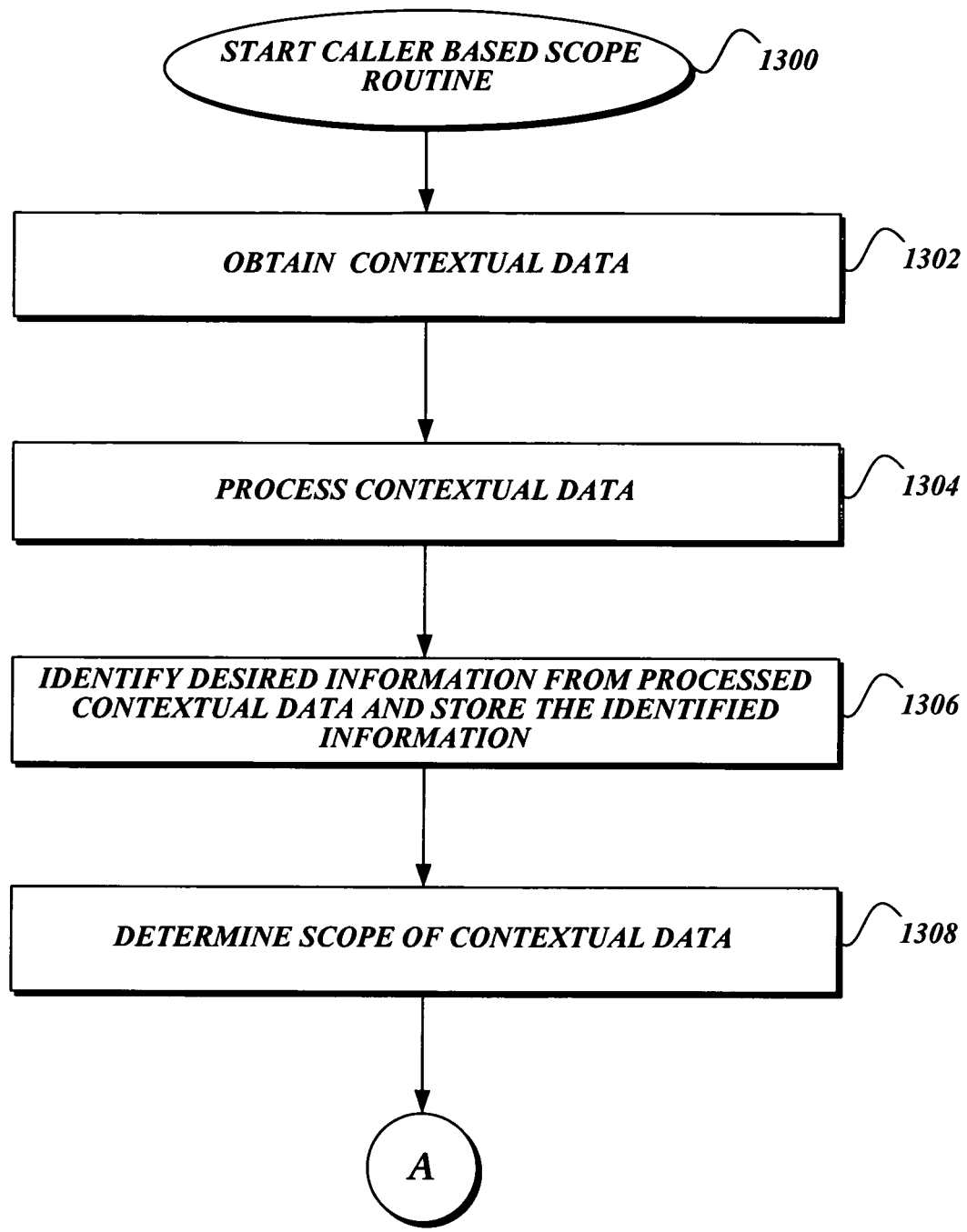
FIGS. 13A and 13B are flow diagrams illustrating a caller based scope routine in accordance with an aspect of the present invention.
Figure 13B:
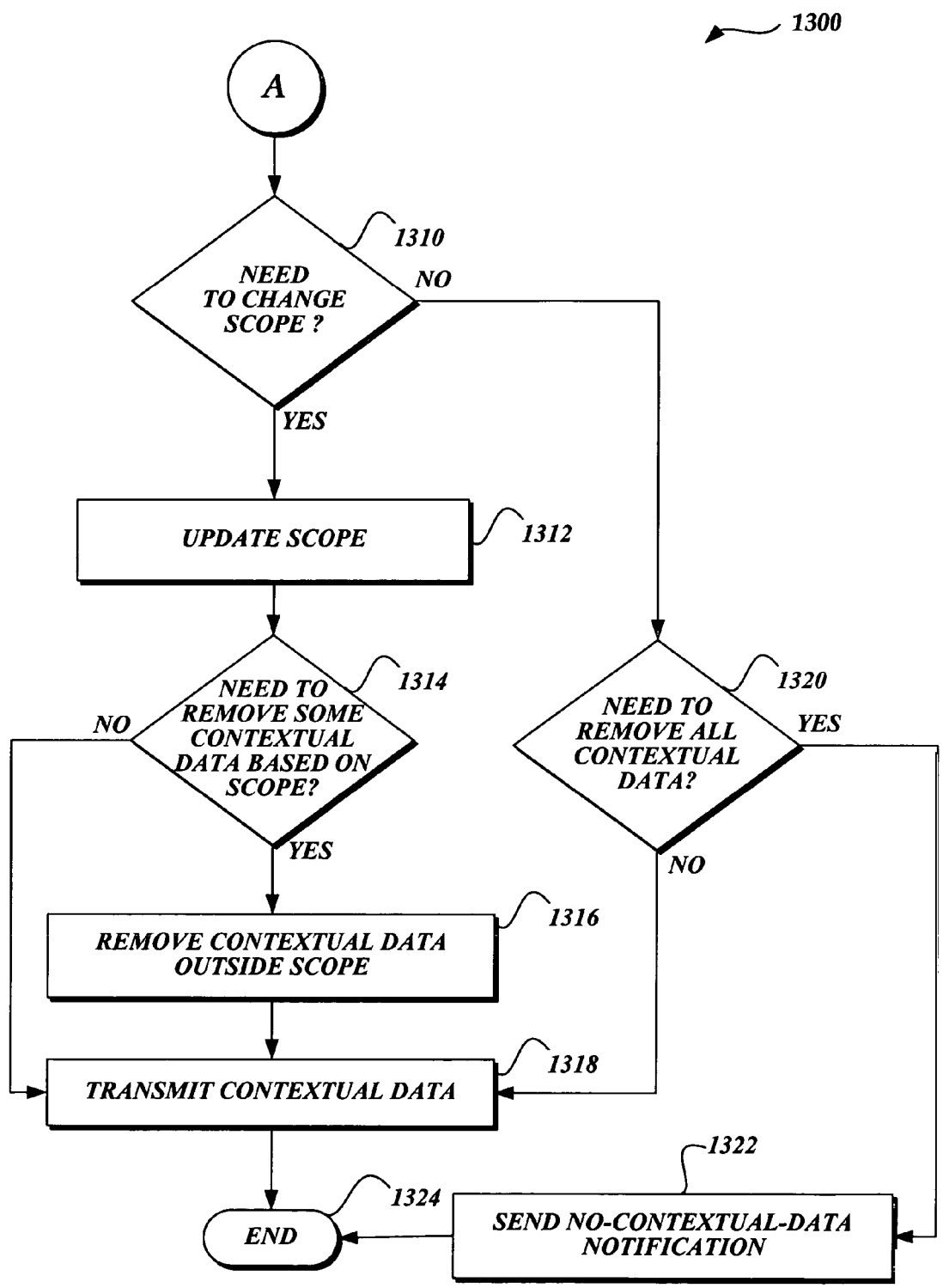

FIGS. 13A and 13B are flowcharts illustrating a caller-contextual data processing routine 1300 for collecting and processing caller contextual information in accordance with an embodiment of the present invention. In an illustrative embodiment, a device of a caller (a calling VoIP client) may have requested its associated service provider to initiate a communication channel connection with a callee (a called VoIP client).

With reference to FIG. 13, a flowchart of a caller based scope routine 1300 is shown. For the purpose of discussion, assume that an information sending client (e.g., a calling VoIP client, a called VoIP client, etc.) transmits contextual information to its service provider over an existing communication channel. A service provider of the information sending client has an authority to determine the scope of the contextual information which is transmitted. However, it is contemplated that the contextual information can be exchanged among the various VoIP entities at any time, including before establishing a communication channel (e.g., during a connection set-up phase), during a conversation, or after terminating a communication channel. It is further contemplated that any authorized VoIP entity in the IP environment 100 can add, remove, update and/or store part of the contextual information which is transmitted.

Beginning at block 1302, the service provider obtains contextual information from the information sending client. As described above, based on the content of the contextual information, the information sending client identifies at least one structured hierarchy from predefined structured hierarchies, such as XML namespace and the like. The service provider may obtain the identified structured hierarchies from the information sending client. The information sending client can be any VoIP entity which is capable of transmitting contextual information as part of a conversation. At block 1304, the service provider processes the obtained contextual information based on the identified structured hierarchies. At block 1306, a set of desired information may be identified from the processed contextual information, collected and stored by the service provider. For example, contextual information relating to a calling plan, client identification information, billing information, user preference, client's rule's, and the like may be collected from the processed contextual information and stored in a local storage of the service provider. At block 1308, the service provider determines the scope of contextual information which is transmitted. In one embodiment, the service provider determines the scope of contextual information based on a destination (e.g., VoIP clients, service providers, third party service provider, etc.) of the contextual information. For example, if the destined client (destination client) is a third party service provider which can provide particular VoIP services, the service provider determines the scope of contextual information according to the particular VoIP services. Alternatively, the information sending client can specify a set of rules relating to defining a scope of the contextual information based on a destination of the contextual information. The set of rules may be transmitted as part of contextual information during a connection set-up phase. The routine 1300 proceeds to connecting terminal A. (See FIG. 13B.)

Referring to FIG. 13B, starting from terminal A, the routine 1300 continues to decision block 1310 to determine whether there is a need to change the scope of the obtained contextual information to transmit to the destination client. If it is determined at decision block 1310 that there is a need of changing the scope of the obtained contextual information, the service provider updates the scope at block 1312. In one embodiment, before collecting contextual information to transfer, the service provider may update the scope in accordance with the set of rules provided by the information sending client. The set of rules may define which type of contextual information will be removed or updated.

At decision block 1314, a determination is made as to whether, based on the updated scope, part of contextual information needs to be removed before being transmitted. If it is determined at decision block 1314 that part of contextual information needs to be removed, the service provider removes contextual information which is outside of the updated scope at block 1316. In one embodiment of the present invention, the service provider can also add more information to the contextual information if the determined scope is broader than the scope of the contextual information as obtained. After the part of contextual information is removed at block 1316 or if it is determined at decision block 1314 that the contextual information will be transmitted as obtained (discussed below), at block 1318, the contextual information is transmitted to the destination client.

If it is determined at decision block 1310 that there is no need of changing the scope of the contextual information, at decision block 1320, a determination is made as to whether the service provider needs to remove all contextual information. If it is determined at decision block 1320 that all contextual information needs to be removed, the service provider sends a notification indicating that no contextual information will be transmitted to the destination client at block 1322. If it is determined at decision block 1320 that the contextual information will be transmitted as obtained, the service provider transmits the contextual information to the destination client, based on the determined scope. The routine 1300 completes at block 1324. It is to be understood that the routine 1300 can be implemented when more than two VoIP clients communicate with each other over multiple communication channels.

Figure 14:
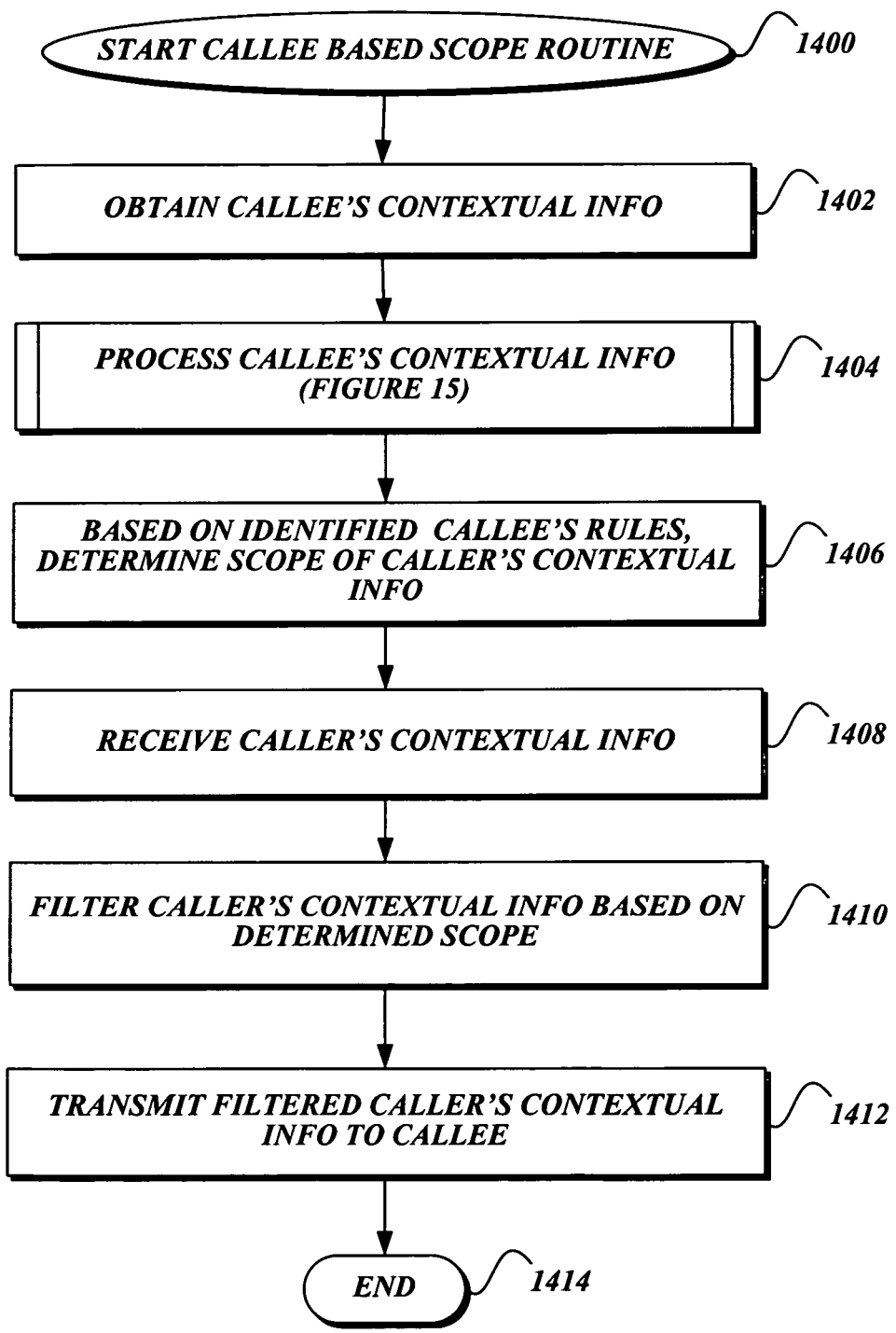
FIG. 14 is a flow diagram illustrating a caller based scope routine in accordance with an aspect of the present invention.

FIG. 14 illustrates a flowchart of a callee based scope routine 1400 in accordance with an embodiment of the present invention. For the purpose of discussion, assume that there is an existing communication channel between devices of a calling VoIP client (caller) and a called VoIP client (callee). A service provider of the callee may have an authority to determine and update the scope of caller's contextual information which is transmitted to the callee. As with FIG. 13, it is contemplated that the contextual information can be exchanged among the various VoIP entities at any time (before establishing a communication channel, during a conversation, or after terminating a communication channel). It is further contemplated that any authorized VoIP entity in the IP environment 100 can add, remove, update and/or store part of the contextual information which is transmitted. It is also to be understood that the routine 1400 can be implemented when more than two VoIP clients communicate with each other over multiple communication channels.

Beginning at block 1402, the service provider obtains the callee's contextual information including the callee's rules, device related information and the like. At subroutine block 1404, the service provider processes the obtained contextual information utilizing a contextual data processing subroutine (see FIG. 15) for identifying the callee's rules. As will be discussed below, the contextual data processing routine returns identified rules for determining scope of contextual information to be collected. The routine 1400 proceeds to block 1406 where the service provider determines the scope of the caller's contextual information which is transmitted to callee, based on the identified callee's rules. At block 1408, the service provider receives the caller's contextual information. Upon receipt of the caller's contextual information, the service provider may filter the caller's contextual information utilizing the determined scope. Alternatively, the service provider may receive only a subset of the caller's contextual information within the determined scope. In one embodiment, the callee's contextual information may include a set of rules excluding particular contextual information to receive. For example, the received caller's contextual information may include a multi-media file while the callee has specified a set of rules indicating to exclude any multi-media data packets from incoming data packets.

Based on this set of callee's rules, the service provider will update a scope of the contextual information destined to the callee. The multi-media file from the caller's contextual information may be filtered through the updated scope and removed before transmitting the caller's contextual information to the callee. Alternatively, the service provider or the callee may request that the caller not send any multi-media file via an exchange of contextual information between the callee and the caller during a connection set-up phase. Likewise, when the received caller's contextual information lacks information, the service provider may provide or obtain the missing information. For example, the received caller's contextual information may lack service provider information of the caller while the callee has specified a set of rules to apply different call plans associated with different service providers. In this example, the service provider may provide additional information relating to the service provider information of the caller. Such additional information may be previously obtained and stored on the service provider of the callee, or it may be obtained from the service provider of the caller. At block 1410, the service provider filters the caller's contextual information based on the determined scope. Any contextual information outside of the determined scope will be removed. At block 1412, the filtered caller's contextual information is transmitted to the callee. The routine 1400 completes at block 1414.

In one embodiment, a subset of the received contextual information corresponding to the removed or updated contextual information may be stored on local storage of a service provider, devices of a VoIP client, a third party service provider, and the like. The stored contextual information may be utilized for future reference by various VoIP entities and/or for usage in by applications other than VoIP related. For the purpose of discussion, assume that a device of a callee does not support predefined identifiers which represent emotions, sounds (e.g., "ah", "oops", "wow", etc.) and facial expressions in graphical symbols. One category of the predefined identifiers may be a voice-emotion identifier corresponding to a predetermined sound and/or a graphic symbol. Upon receipt of a certain voice-emotion identifier, a device may generate the corresponding predetermined sound and/or display the corresponding graphic symbol. During a conversation, a caller may send caller's mood, in a voice-emotion identifier that sounds like a loud laugh, indicating that the caller is very happy. The service provider of the callee may remove the received contextual information corresponding to the voice-emotion identifier due to the limitation of the callee's device engaging in a conversation. At the same time, the callee may have another service that allows one of callee's devices to interact with the service provider and capture call details (with whom, when, what was the mood and keywords etc.) in a call log during a conversation. The service provider will provide the contextual information corresponding to the voice-emotion identifier to the callee via the service. In this example, the callee may actually obtain that contextual data (the voice-emotion identifier) which has been removed by the service provider for a conversation. The callee may save the voice-emotion identifier with the call log entry and the like.

Figure 15:
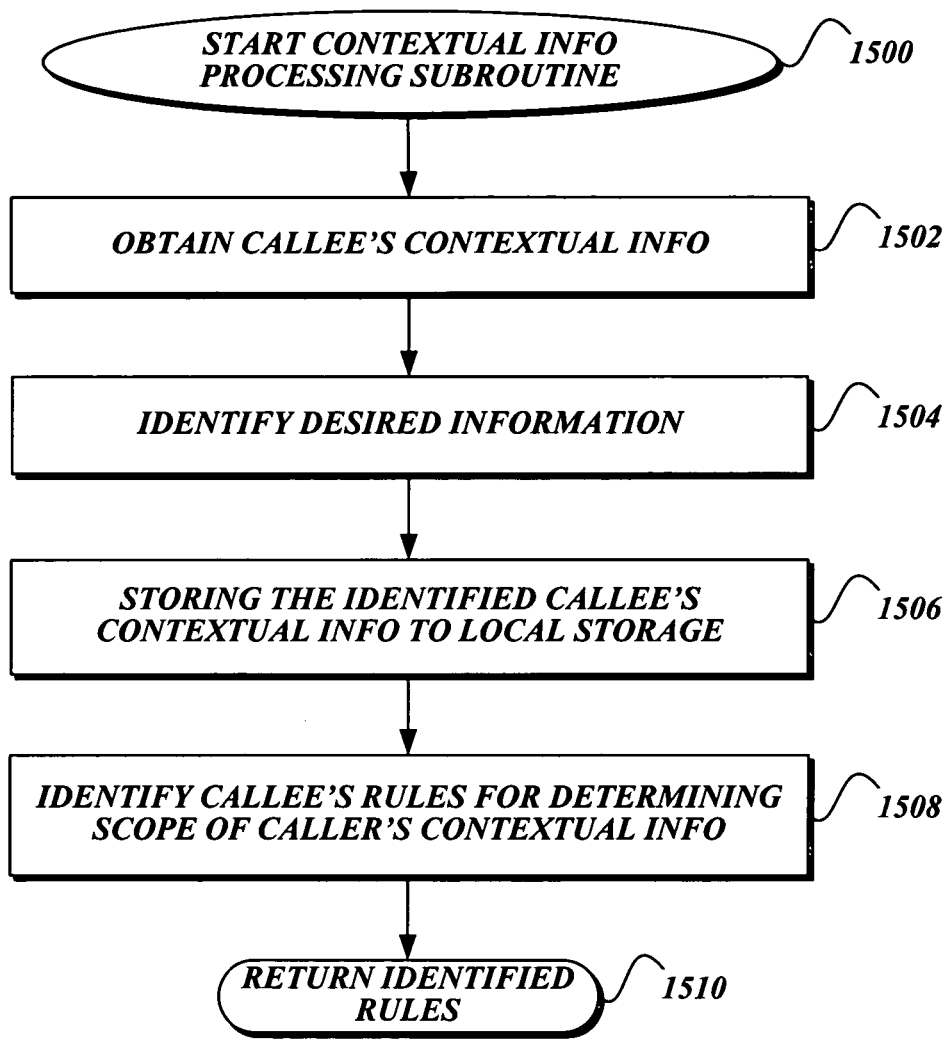
FIG. 15 is a flow diagram illustrating a contextual data processing routine in accordance with an aspect of the present invention.

FIG. 15 illustrates a block diagram of a contextual information processing subroutine 1500 in accordance with an embodiment of the present invention. The contextual information processing routine 1500 starts with block 1502 where the service provider receives the callee's contextual information, including a set of the callee's rules, user preference, etc. At block 1504, the service provider identifies desired information from the callee's contextual information. At block 1506, upon identifying the desired information, the service provider stores the desired callee's contextual information in a local storage, or a storage server. The service provider further identifies a set of callee's rules which relate to a scope of the caller's contextual information at block 1508. For example, a set of callee's rules may limit the amount and type of incoming contextual information relating to a particular caller. Similarly, a set of callee's rules may require specific contextual information which is not currently available from the caller's contextual information. The subroutine 1500 returns the identified rules and completes at block 1510.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for communicating contextual information relating to a conversation between a caller and a callee on a voice communication channel, comprising:
   obtaining caller contextual information from the caller that is exchanged using the voice communication channel; wherein the voice communication channel is used to transmit contextual data packets and conversational data packets during the conversation; wherein the caller contextual information is based on a caller rule used in determining the caller contextual information to be transmitted between the caller and the callee;
   obtaining callee contextual information based on a callee rule used in determining callee contextual information to be transmitted between the callee and the caller;
   determining a first scope of the callee contextual information;
   determining a second scope of the caller contextual information;
   determining whether to change the first scope of the callee contextual information based on the second scope of the caller contextual information;
   updating the callee contextual information based on the determined the second scope of the caller contextual information; and
   transmitting the callee contextual information.

2. The method of claim 1, wherein transmitting the callee contextual information includes a method for communicating callee contextual information by adding additional information to the callee contextual information that is transmitted.

3. The method of claim 1, wherein updating the callee contextual information includes identifying information to be deleted from the callee contextual information, storing the identified information in storage, and deleting the identified information from the callee contextual information.

4. The method of claim 1 further comprising:
   if it is determined to remove all of the callee contextual information, transmitting a notification which indicates that there is no contextual data to be transferred for the conversation.

5. The method of claim 1 further comprising:
   if it is determined not to change the scope of the callee contextual information, transmitting the callee contextual information without having any updates.

6. The method of claim 1 further comprising:
   retrieving previously obtained contextual information relating to the conversation.

7. The method of claim 1, wherein the callee contextual information is transmitted over a Voice over Internet Protocol communication channel.

8. The method of claim 1, wherein the callee contextual information is transmitted as part of the conversation.

9. The method of claim 1, wherein the callee contextual information is transmitted to a third party service provider.

10. The method of claim 9, wherein the third party service provider changes the scope of the callee contextual information to be transmitted.

11. A system for collecting and transmitting contextual information relating to a conversation on a communication channel between a first client and a second client, comprising:
   a processor; and
   a computer readable memory having computer executable instructions, which when executed by the processor, perform the method of:
      obtaining caller contextual information from a caller that is exchanged using a voice communication channel; wherein the voice communication channel is used to transmit contextual data packets and conversational data packets during the conversation; wherein the caller contextual information is based on a caller rule used in determining the caller contextual information to be transmitted between the caller and a callee;
      obtaining callee contextual information based on a callee rule used in determining the callee contextual information to be transmitted between the callee and the caller;
      determining a first scope of the callee contextual information;
      determining a second scope of the caller contextual information;
      determining whether to change the first scope of the callee contextual information based on the second scope of the caller contextual information; and
      updating the callee contextual information based on the determined the second scope of the caller contextual information; and
      transmitting the callee contextual information.

12. The system of claim 11, wherein transmitting the callee contextual information includes adding additional information to the callee contextual information that is transmitted.

13. The system of claim 11, wherein updating the callee contextual information includes identifying information to be deleted from the callee contextual information, storing the identified information in storage, and deleting the identified information from the callee contextual information.

14. The system of claim 11 further comprising:
   if it is determined to remove all of the callee contextual information, transmitting a notification which indicates that there is no contextual data to be transferred for the conversation.

15. The system of claim 11 further comprising:
   if it is determined not to change the scope of the callee contextual information, transmitting the callee contextual information without having any updates.

16. The system of claim 11, further comprising:
   retrieving previously obtained contextual information relating to the conversation.

17. The system of claim 11, wherein the callee contextual information is transmitted over a Voice over Internet Protocol communication channel.

18. A computer readable memory device having computer executable components for collecting and transmitting contextual information, comprising:
   a contextual information handling component for obtaining caller contextual information from a caller, wherein the caller contextual information is based on a caller rule used in determining the caller contextual information to be transmitted between the caller and a callee, and obtaining callee contextual information based on a callee rule used in determining the callee contextual information to be transmitted between the callee and the caller;
   a scope management component for determining a first scope of the callee contextual information and a second scope of the caller contextual information, the scope management component determining whether to change the first scope of the callee contextual information based on the second scope of the caller contextual information, and updating the callee contextual information based on the determined the second scope of the caller contextual information; and a transmitting component for transmitting the callee contextual information as part of a conversation.

19. The computer readable memory device of claim 11, wherein transmitting the callee contextual information includes adding additional information to the callee contextual information that is transmitted.

20. The computer readable memory device of claim 11, wherein updating the callee contextual information includes identifying information to be deleted from the callee contextual information, storing the identified information in storage, and deleting the identified information from the callee contextual information.

\* \* \* \* \*